(12) United States Patent
Crissman et al.

(10) Patent No.: US 6,401,756 B1
(45) Date of Patent: Jun. 11, 2002

(54) INTEGRAL STERILE ACCESS/ GMP DIAPHRAGM VALVE

(75) Inventors: Paul D. Crissman, Camarillo; Craig L. Iverson; Phil Schwind, both of Simi Valley, all of CA (US)

(73) Assignee: ITT Industries Pure-Flo Solutions Group, Simi Valley, CA (US)

( * ) Notice: Subject to any disclaimer, the term of this patent is extended or adjusted under 35 U.S.C. 154(b) by 0 days.

(21) Appl. No.: 09/810,735

(22) Filed: Mar. 16, 2001

(51) Int. Cl.[7] .................................................. F16K 7/12
(52) U.S. Cl. ....................................... 137/861; 137/883
(58) Field of Search ................................. 137/861, 883; 251/331

(56) References Cited

U.S. PATENT DOCUMENTS

| | | | | |
|---|---|---|---|---|
| 5,273,075 A | * | 12/1993 | Skaer | 137/883 |
| 5,427,150 A | * | 6/1995 | Skaer et al. | 137/883 |
| 5,549,134 A | * | 8/1996 | Browne et al. | 137/606 |
| 5,657,786 A | * | 8/1997 | DuRoss et al. | 137/15 |
| 5,755,155 A | * | 5/1998 | Buesing | 99/453 |
| 5,906,223 A | * | 5/1999 | Pinkham | 137/597 |
| 6,112,767 A | * | 9/2000 | Pinkham | 137/597 |
| 6,250,332 B1 | * | 6/2001 | Backlund | 137/597 |

* cited by examiner

*Primary Examiner*—John Fox
(74) *Attorney, Agent, or Firm*—Stetina Brunda Garred & Brucker

(57) ABSTRACT

An integral sterile access/GMP valve housing having an integrally formed valve housing block. The housing having an inlet port, an outlet port, and a sampling port. The housing having an upstream passage extending from the inlet port. The housing having a downstream passage extending to the outlet port. The housing having a main flow weir disposed between the upstream and downstream passages. The housing having a primary passage extending from the downstream passage. The housing having a secondary passage extending to the sampling port. The valve housing having a sampling weir disposed between the primary and secondary passages. The housing is positionable in a sterile access orientation with the sampling weir and lowermost portions of the downstream and primary passages being horizontally aligned. The housing is positionable in a GMP orientation with the main flow weir and lowermost portions of the downstream and primary passages being horizontally aligned.

16 Claims, 6 Drawing Sheets

INTEGRAL STERILE ACCESS/ GMP DIAPHRAGM VALVE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to fluid valves, and more particularly to diaphragm type valves used in sterile access and GMP orientations.

A diaphragm type main flow valve includes a valve housing body. The valve housing body has an inlet port which connects with an upstream passage which extends into the valve housing body. The valve housing body further has a downstream passage which is aligned with the upstream passage. The downstream passage extends to an outlet port. A main flow valve mounting surface is formed upon the valve housing body. A main flow valve weir is formed in the valve housing body adjacent the main flow valve mounting surface, and separates the upstream and downstream passages. A diaphragm type valve housing may be mounted upon the main flow valve mounting surface, with a diaphragm being configured to engage the main flow valve weir. Actuation of the diaphragm against the main flow valve weir prevents fluid flow between the upstream and downstream passages thereby closing the valve. As such, with the diaphragm in a closed position, fluid flow from the upstream sampling passage is prevented from entering into the downstream passage. With the diaphragm in an open position, the downstream passage is in fluid communication with the upstream passage for passage of fluid flow from the upstream sampling passage. In this regard, the main flow valve is intended to control fluid flow in a product main flow path to which it is attached.

In order to obtain product samples from such product main flow path, the main flow valve may have a separate sampling valve attached to it. Such valve may additionally function as a purge valve. The sampling valve may have a sampling valve housing body which has a primary passage which is in fluid communication with the downstream passage of the main flow valve housing body. In this regard, the primary passage may be connected, typically welded, to the downstream passage through intermediate piping. This inherently creates a dead-leg within the intermediate piping. The sampling valve housing body further has a secondary passage which terminates at a sampling port. A sampling valve mounting surface is formed upon the sampling valve housing body. A sampling valve weir is formed in the sampling valve housing body adjacent the sampling valve mounting surface, and separates the primary and secondary passages. A diaphragm type valve housing may be mounted upon the sampling valve mounting surface, with a diaphragm being configured to engage the sampling valve weir.

In this regard, with the diaphragm of the main flow valve in the open position, fluid flow is allowed to pass into the downstream passage an into the primary passage of the sampling valve housing body. With the sampling valve in an open position, fluid flow is allowed to further pass over the sampling weir, into the secondary passage, and out the sampling port.

As mentioned above, such main flow and attached sampling valves may be used for sampling fluid product from a main flow path. These valve arrangements have application in a wide range of fluid handling systems, such as those for pharmaceutical, biotech processing, food and beverage, and cosmetic and consumer products applications. Such applications are typically subject to strict governmental regulations and industry practices and procedures. Cleanliness and sterility of the downstream passage of the main flow valve housing body and the attached primary passage of the sampling valve housing body. In this regard, efficient gravitational drainage of the downstream passage and the intersecting primary passage is of particular concern.

The interior drainage design characteristics of the downstream and primary passages are dependent upon the orientation of the overall main flow/sampling valve arrangement is to be installed. Those main flow/sampling valve arrangements which are designed to be utilized with the upstream and downstream passages of the main flow valve housing body arranged horizontally are referred to as sterile access valves. Those main flow/sampling valve arrangements which are designed to be utilized with the upstream and downstream passages of the main flow valve housing body arranged vertically are referred to as GMP (good manufacturing practices) valves.

A problem encountered with such sterile access valves and GMP valves is that inherent in their current designs, they cannot be use interchangeably. In this regard, while contemporary sterile access valves are designed to have efficient drainage characteristics when utilized in their intended horizontal configuration, use of such sterile access valves in a vertical orientation results in entrapped fluids or otherwise non-draining regions. Similarly, use of such GMP valves in a horizontal orientation results in entrapped fluids or otherwise non-draining regions. As such, those responsible for maintain fluid product handling systems must typically must carry dedicated inventories of both sterile access and GMP valves. However, as such valves perform the same function utilization of two different valve designs is inefficient. Another problem associated with the above described valve arrangements is that the main flow valve and the sampling (or purge) valve are separate structures. Further mentioned above intermediate piping must typically be welded to both valve structures. This inherently creates a dead-leg within the intermediate piping. Accordingly, there is a need in the art for an improved main flow valve and sampling (purge) valve arrangement in comparison to the prior art.

BRIEF SUMMARY OF THE INVENTION

In accordance with an embodiment of the present invention, an integral sterile access/GMP valve housing which includes an integrally formed valve housing block. The valve housing further includes main flow and sampling valve mounting surfaces formed upon the valve housing block. The valve housing further includes an inlet port, an outlet port, and a sampling port each respectively formed in the valve housing block. The valve housing further includes an upstream passage which extends from the inlet port to the main flow valve mounting surface. The valve housing further includes a downstream passage which extends from the main flow valve mounting surface to the outlet port. The valve housing further includes a main flow weir which is disposed adjacent the main flow valve mounting surface between the upstream and downstream passages for controlling flow between the upstream and downstream passages. The valve housing further includes a primary passage which extends from the downstream passage to the sampling valve mounting surface. The valve housing further includes a secondary passage which extends from the sampling valve mounting surface and to the sampling port. The valve housing further includes a sampling weir which is disposed adjacent the sampling valve mounting surface between the primary and secondary passages for controlling flow between the primary and secondary passages. Importantly, the valve housing is positionable in a sterile access orientation with the sampling weir and lowermost portions of the downstream and primary passages being horizontally aligned. Further, the valve housing is positionable in a GMP orientation with the main flow weir and lowermost portions of the downstream and primary passages being horizontally aligned.

According to an embodiment of the present invention, the main flow weir is formed perpendicular to the sampling weir. The downstream passage has opposing first and second curved ends extending from the main flow weir adjacent the main flow valve mounting surface. The first curved end of the downstream passage is disposed along the lowermost portion of the downstream passage when the valve housing is in the GMP orientation. Further, the sampling weir is tangentially formed with the first curved end of the downstream passage. Similarly, the primary passage may have has opposing first and second curved ends extending from the sampling weir adjacent the sampling valve mounting surface. The first curved end of the primary passage is disposed along the lowermost portion of the primary passage when the valve housing is in the sterile access orientation. The main flow weir is tangentially aligned with the first curved end of the primary passage.

The valve housing block may be a rectangular body. In this regard, the valve housing block may have a front face and an opposing back faces. The main flow valve mounting surface may be formed upon the front face, and the sampling valve mounting surface may be formed upon the back face. The front and back faces may be parallel to one another. The valve housing block may further have opposing first and second end faces. The inlet port may be formed in the first end face, and the outlet port may be formed in the second end face. The first and second end faces may be formed orthogonal to the front and back faces. In addition, the valve housing block may have opposing third and forth end faces with the sampling port being formed in the third end face.

In one embodiment of the present invention, the downstream passage adjacent the main flow valve mounting surface is generally the same size as the primary passage adjacent the sampling valve mounting surface. In another embodiment of the present invention, the downstream passage adjacent the main flow valve mounting surface is sized smaller than the primary passage adjacent the sampling valve mounting surface.

As such, based on the foregoing, the present invention mitigates the inefficiencies and limitations associated with prior art arrangements. In particular, as mentioned above, the valve housing is positionable in a sterile access orientation with the sampling weir and lowermost portions of the downstream and primary passages being horizontally aligned. Such alignment allows for drainage of the downstream and primary passages. Further, the valve housing is positionable in a GMP orientation with the main flow weir and lowermost portions of the downstream and primary passages being horizontally aligned. Such alignment allows for drainage of the downstream and primary passages. In this regard, the integral sterile access/GMP valve housing of the present invention is specifically designed to allow for proper drainage of the downstream and primary passages in both the sterile access and GMP orientations. Such valve housing design avoids having to inventory two different valve housing parts in favor of a single dual purpose valve housing of the present invention. In addition, the sampling valve components are integrally formed with the main flow components. This not only avoids attachment fabrication steps of such structures as in the prior art, but also avoids usage of intermediate piping which creates an inherent dead-leg associated with such attachment. Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE INVENTION

Referring now to the drawings wherein the showings are for purposes of illustrating a preferred embodiment of the present invention only, and not for purposes of limiting the same, FIGS. 1–15 illustrate preferred embodiments of the valve housing according to aspects of the present invention.

Figure 1:
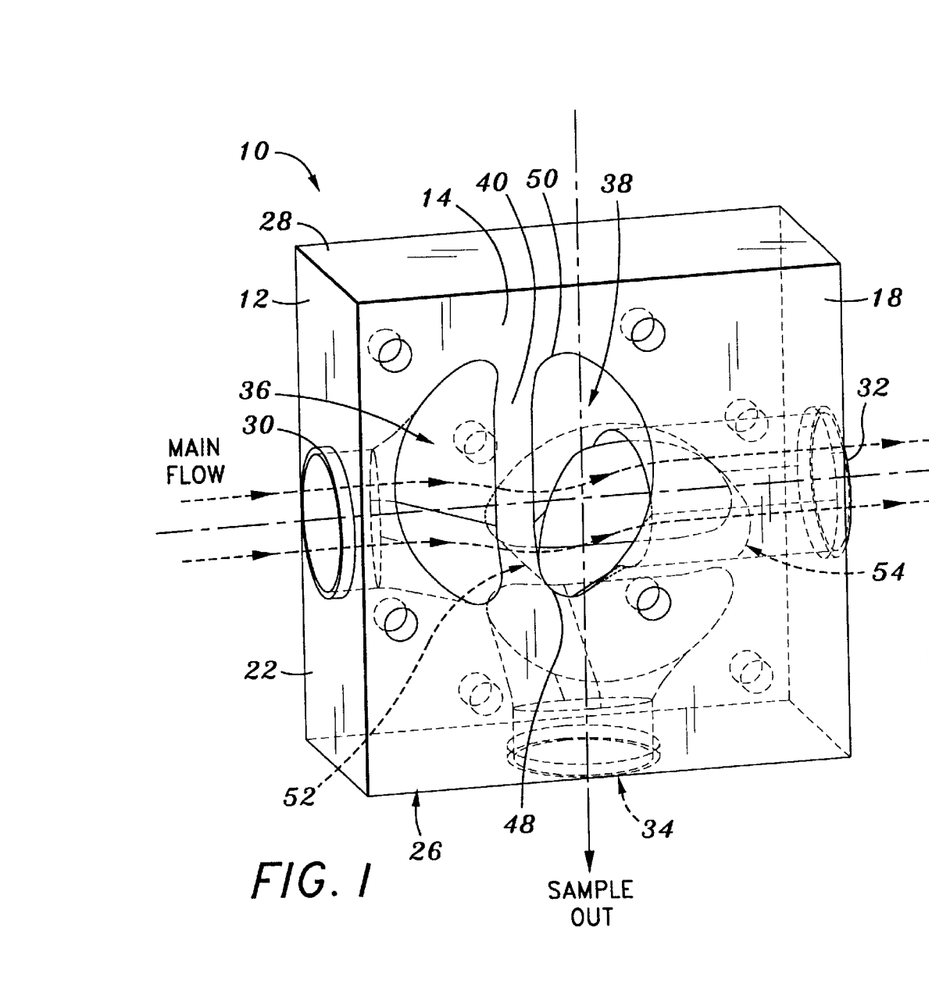
FIG. 1 is a raised perspective view of an integral sterile access/GMP valve housing, oriented in a sterile access orientation with a main flow valve mounting surface shown (with a main flow path shown in dashed lines and with internal passages shown in phantom) according to an embodiment of the present invention.
Figure 2:
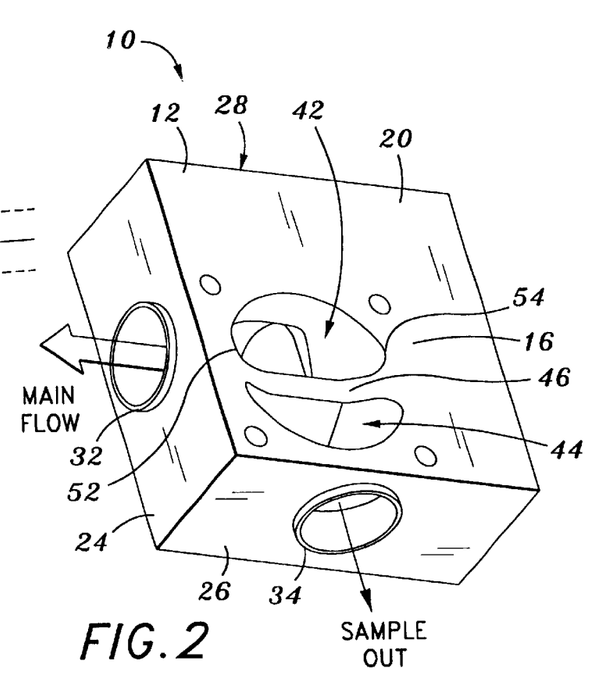
FIG. 2 is lowered perspective view of the integral sterile access/GMP valve housing, with a sampling mounting surface shown (with internal passages shown in phantom)
Figure 6:
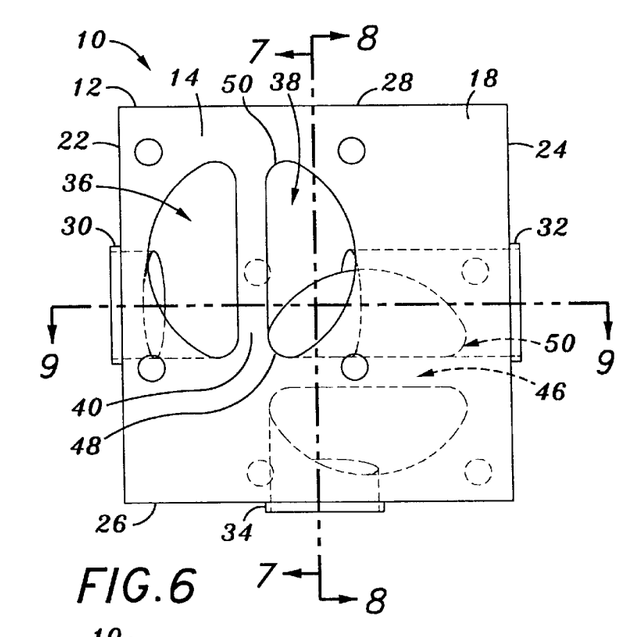
FIG. 6 is a side view of the integral sterile access/GMP valve housing, with the main flow valve mounting surface shown (with internal passages shown in phantom)
Figure 7:
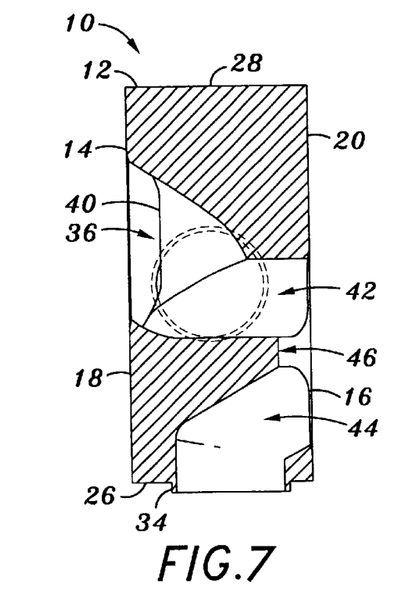
FIG. 7 is a cross sectional view of the integral sterile access/GMP valve housing as seen along axis 7—7 of FIG. 6.
Figure 8:
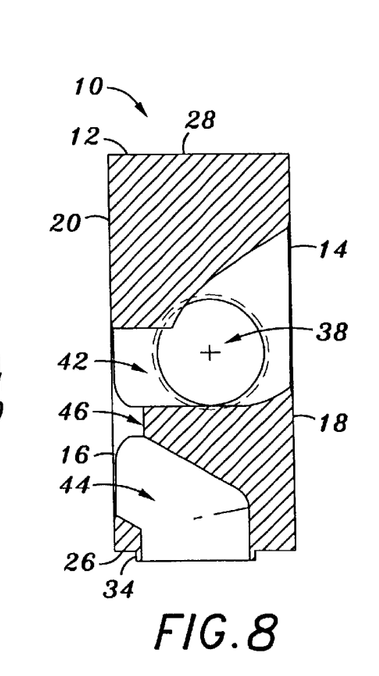
FIG. 8 is a cross sectional view of the integral sterile access/GMP valve housing as seen along axis 8—8 of FIG. 6.
Figure 9:
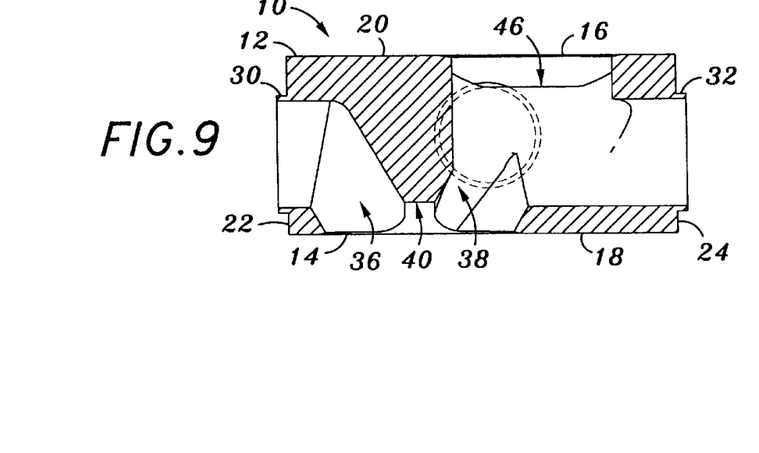
FIG. 9 is a cross sectional view of the integral sterile access/GMP valve housing as seen along axis 9—9 of FIG. 6.

Referring now to FIGS. 1 and 2 there is depicted an integral sterile access/GMP valve housing 10 (with internal passages shown in phantom) according to a first embodiment of the present invention. The valve housing 10 is provided with an integrally formed valve housing block 12. Preferably, the valve housing block 12 is a rectangular body. In this regard, the valve housing block 12 may have a front face 18 and an opposing back face 20. FIG. 1 is a raised perspective view of the valve housing 10 oriented with the front face 18 shown. FIG. 6 is a side view of the valve housing 10 with direct view of the front face 18. FIG. 2 is a lowered perspective view of the valve housing 10 with the back face 20 shown. FIG. 6 is a side view of the valve housing 10 with direct view of the back face 20. The front and back faces 18, 20 may be parallel.

Figure 3:
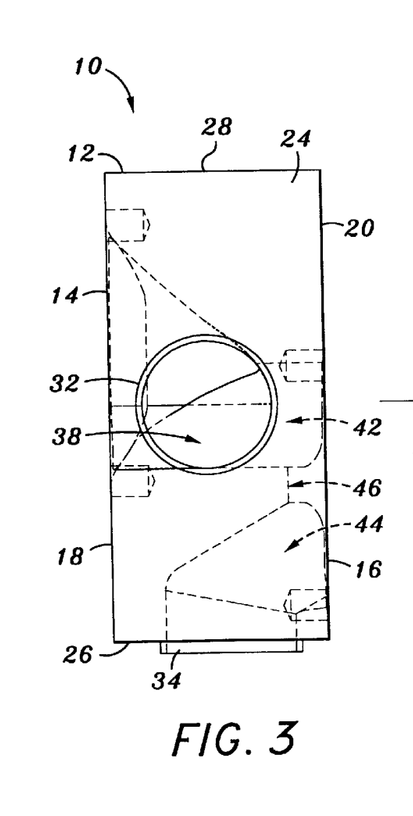
FIG. 3 is a side view of the integral sterile access/GMP valve housing, with an outlet port shown (with internal passages shown in phantom)
Figure 4:
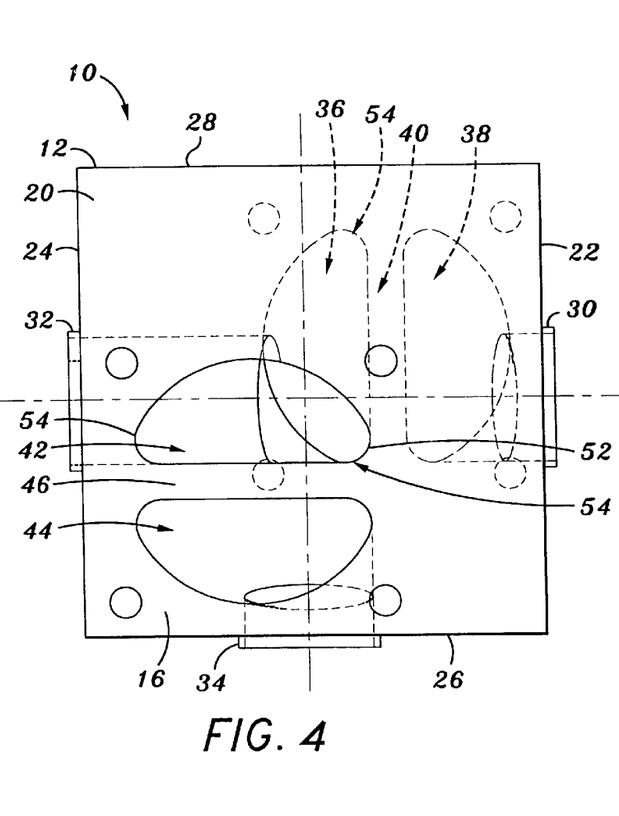
FIG. 4 is a side view of the integral sterile access/GMP valve housing, with the sampling valve mounting surface shown (with internal passages shown in phantom)
Figure 5:
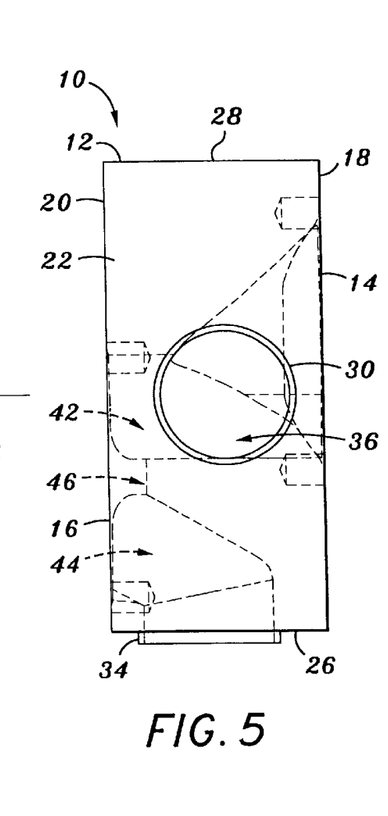
FIG. 5 is a side view of the integral sterile access/GMP valve housing, with an inlet port shown (with internal passages shown in phantom)

The valve housing block 12 may further have opposing first and second end faces 22, 24. FIG. 3 is a side view of the valve housing 10 with direct view of the first end face 22. FIG. 5 is a side view of the valve housing 10 with direct view of the second end face 24. The first and second end faces 22, 24 may be disposed orthogonal to the front and back faces 18, 20. The valve housing block 12 may further have opposing third and forth end faces 26, 28 as respectively seen in FIGS. 2 and 1. Third and forth end faces 26, 28 may be disposed orthogonal to the first and second end faces 22, 24 as well as the front and back faces 18, 20.

The valve housing 10 is provided with main flow and sampling valve mounting surfaces 14, 16 formed upon the valve housing block 12. The main flow valve mounting surface 14 may be disposed upon the front face 18. The sampling valve mounting surface 16 may be disposed upon the back face 20. The valve housing 10 is provided with an inlet port 30, an outlet port 32, and a sampling port 34 each respectively formed in the valve housing block 12. In particular, the inlet port 30 may be disposed at the first end face 22, the outlet port 32 may be disposed at the second end face 24, and the sampling port 34 may be disposed at the third end face 26.

The valve housing 10 is provided with an upstream passage 36 which extends from the inlet port 30 to the main flow valve mounting surface 14. The valve housing 10 is further provided with a downstream passage 38 which extends from the main flow valve mounting surface 14 to the outlet port 32. Preferably, the upstream and downstream passages 14, 16 are aligned with each other in a common plane. Further, the valve housing 10 is provided with a main flow weir 40 which is disposed adjacent the main flow valve mounting surface 14 between the upstream and downstream passages 36, 38 for controlling flow between the upstream and downstream passages 36, 38.

Figures 10, 11:
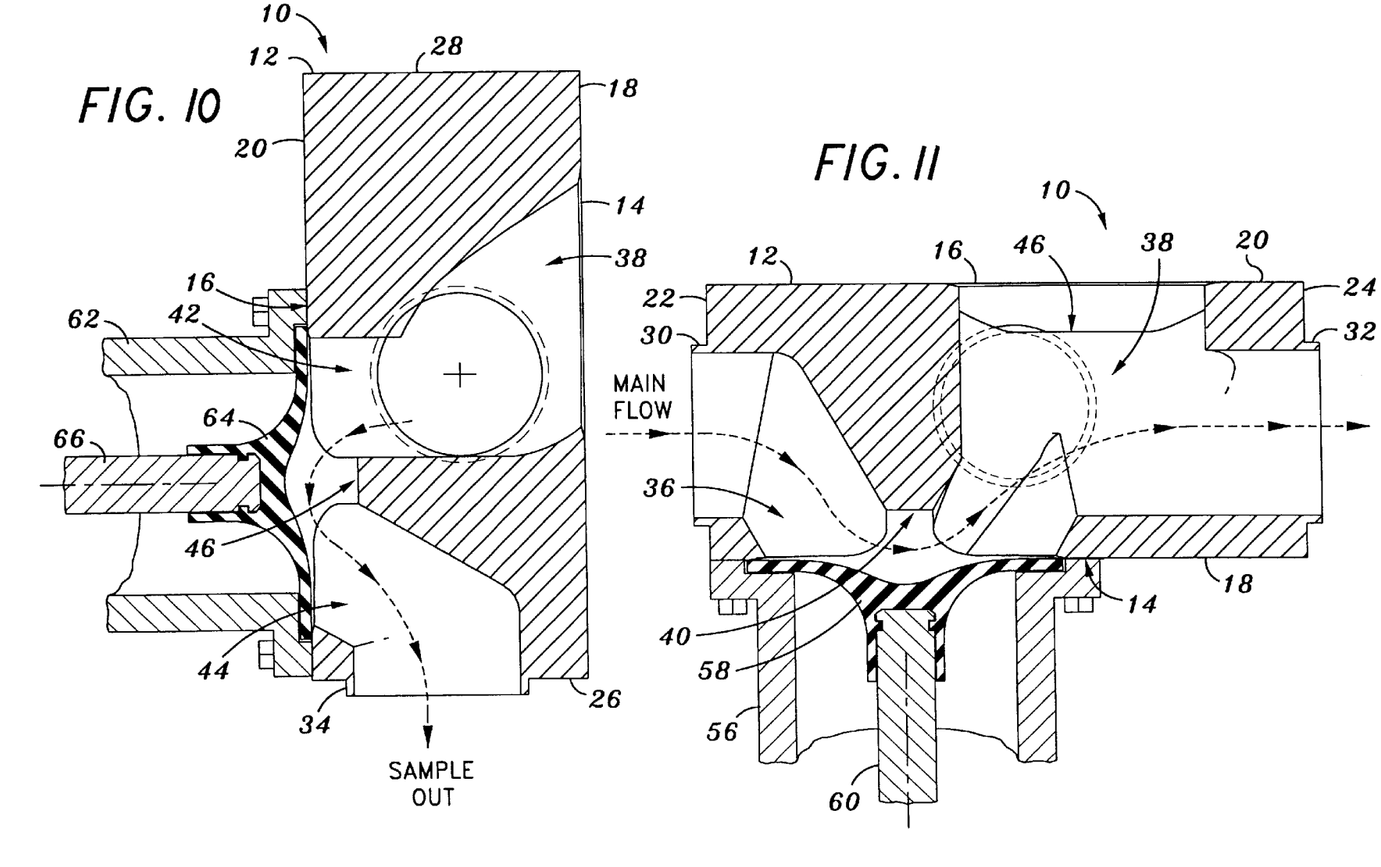
FIG. 10 is the same cross sectional view of the integral sterile access/GMP valve housing of FIG. 8 as shown with a sampling diaphragm housing in an open position (with a sampling flow path shown in dashed lines)
FIG. 11 is the same cross sectional view of the integral sterile access/GMP valve housing of FIG. 9 as shown with a main flow diaphragm housing in an open position (with a main flow path shown in dashed lines)

As such, a main flow conduit or flow path is formed through the valve housing 10. Referring now to FIG. 1, an illustrative main flow path is shown in dashed lines. FIG. 11 depicts a cross-sectional view of the valve housing 10 with the main flow path as seen along axis 9—9 of FIG. 6. Such main flow path begins at the inlet port 30, into the upstream passage 36, over the main flow weir 40, into the downstream passage 38, and finally through the outlet port 32.

The valve housing 12 is contemplated to be utilized with a main flow diaphragm housing 56 as shown in FIG. 11. The main flow diaphragm housing 56 is configured to be mounted to the housing block 12 at the main flow valve mounting surface 14. The main flow diaphragm housing 56 is provided with a main flow diaphragm 58 and a main flow diaphragm actuator 60. Actuation of main flow diaphragm 58 by the main flow diaphragm actuator 60 regulates flow between the upstream and downstream passages 36, 38. FIG. 11 depicts the main flow diaphragm 58 in an open position, thereby allowing fluid flow between the upstream and downstream passages 36, 38 over the main flow weir 40.

In addition, the valve housing 10 is provided with a primary passage 42 which extends from the downstream passage 38 to the sampling valve mounting surface 16. The valve housing 10 is further provided with a secondary passage 44 which extends from the sampling valve mounting surface 16 and to the sampling port 34. The valve housing 10 is provided with a sampling weir 46 which is disposed adjacent the sampling valve mounting surface 16 between the primary and secondary passages 42, 44 for controlling flow between the primary and secondary passages 42, 44. Preferably, the main flow weir 40 is formed perpendicular to the sampling weir 46.

As such, a sampling conduit or flow path is formed through the valve housing 10. Referring now to FIG. 10, there is depicted a cross-sectional view of the valve housing 10 as seen along axis 8—8 of FIG. 6 with an illustrative sampling flow path is shown in dashed lines. Such sampling flow path begins at the primary passage 42 where fluid flow is received from the downstream passage 38. The sampling flow path continues over the sampling weir 46, into the secondary passage 44, and finally through the sampling port 34.

The valve housing 10 is contemplated to be utilized with a sampling diaphragm housing 62 as shown in FIG. 10. The sampling diaphragm housing 62 is configured to be mounted to the housing block 12 at the sampling valve mounting surface 16. The sampling diaphragm housing 62 is provided with a sampling diaphragm 64 and a sampling diaphragm actuator 66. Actuation of the sampling diaphragm 64 by the sampling diaphragm actuator 66 regulates flow between the primary and secondary passages 42, 44. FIG. 10 depicts the sampling diaphragm 64 in an open position, thereby allowing fluid flow between the primary and secondary passages 42, 44 over the sampling weir 46.

Figure 12:
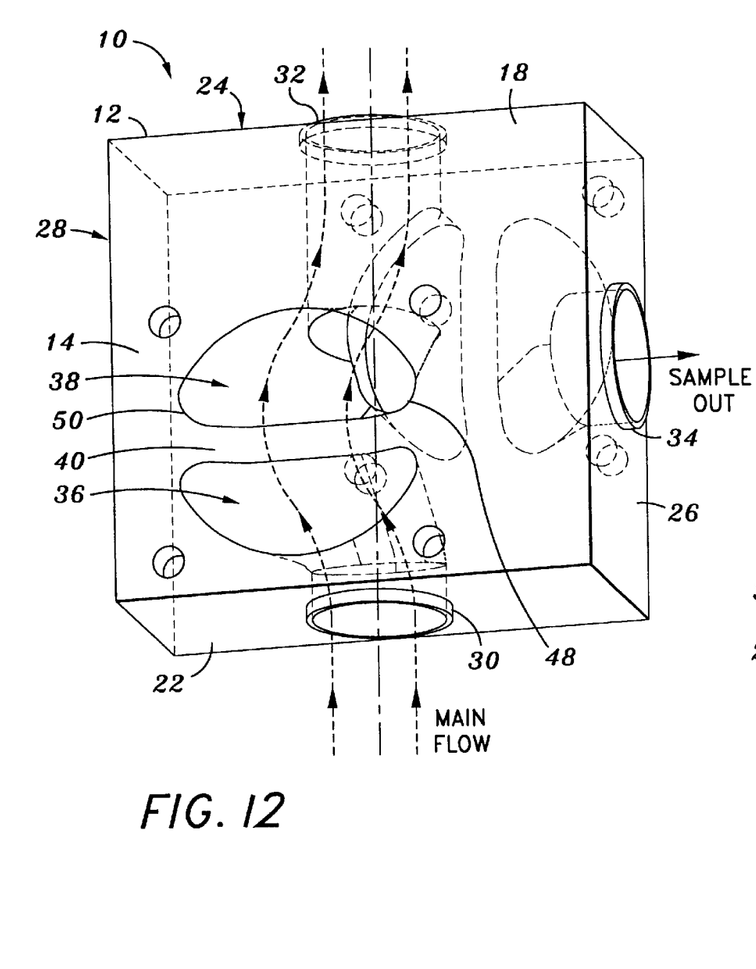
FIG. 12 is lowered perspective view of the integral sterile access/GMP valve housing, oriented in a GMP orientation with the main flow mounting surface shown (with a main flow path shown in dashed lines and with internal passages shown in phantom)
Figure 13:
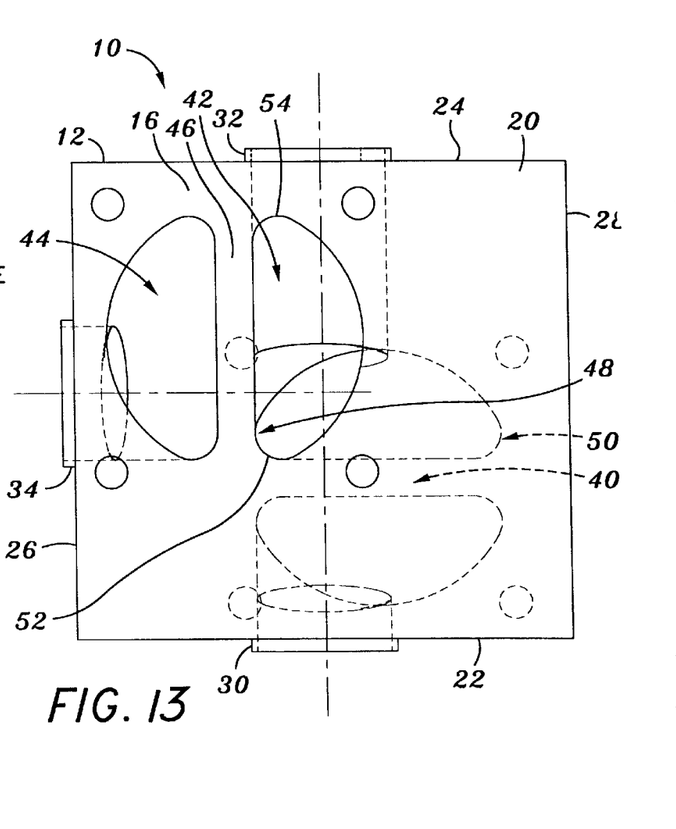
FIG. 13 is a side view of the integral sterile access/GMP valve housing, oriented in a GMP orientation the sampling valve mounting surface shown (with internal passages shown in phantom)

Importantly, the valve housing 10 is positionable in a sterile access orientation with the sampling weir 46 and lowermost portions of the downstream and primary passages 38, 42 being horizontally aligned. FIGS. 1 and 3–11 depict the valve housing 10 in the sterile access orientation. Fluid flow is allowed to pass through valve housing 10, and in particular the upstream and downstream passages 36, 38, generally in a horizontal manner. Further, the valve housing 10 is positionable in a GMP orientation with the main flow weir 40 and lowermost portions of the downstream and primary passages 38, 42 being horizontally aligned. FIGS. 12 and 13 depict the valve housing 10 in the GMP orientation. Fluid flow is allowed to pass through valve housing 10, and in particular the upstream and downstream passages 36, 38, generally in a vertical manner. Preferably, the main flow weir 40 is formed perpendicular to the sampling weir 46.

Advantageously, usage of the valve housing 10 of the present invention is intended to not be directionally dependent. In this regard, the downstream and primary passages 38, 42 are particularly formed for facilitating fluid drainage when the valve housing 10 is oriented in either the sterile access or GMP orientations.

Referring now to the side view of the valve housing 10 as shown in FIG. 3, the downstream passage 38 extends horizontally from the outlet port 32 into the valve housing block 12. As shown, the downstream passage 38 is formed to have a cylindrical shape adjacent to and extending from the outlet port 32. The downstream passage 38 has a dog leg shape as it flanges outward towards the front face 18 adjacent the main flow weir 40, as seen in the cross-sectional top view of FIG. 9. Referring now to the side view of the valve housing 10 as shown in FIG. 6, the downstream passage 38 opens to the main flow valve mounting surface 14 formed upon the front face 18. As seen from this view, the downstream passage 38 has a capital D-shaped cross section. In this regard, the downstream passage 38 has opposing first and second curved ends 48, 50 extending from the main flow weir 40 adjacent the main flow valve mounting surface 14. The first curved end 48 of the downstream passage 38 is disposed along the lowermost portion of the downstream passage 38 when the valve housing 10 is in the sterile access orientation.

As mentioned above, the valve housing 10 is positionable in a sterile access orientation with the sampling weir 46 and lowermost portions of the downstream and primary passages 38, 42 being horizontally aligned. The lowermost portion of the downstream passage 38 is preferably formed contiguously with the lowermost portion of the primary passages 42. As such, with the valve housing 10 in the sterile access orientation, the lowermost portion of the downstream passage 38 horizontally extends from to the first curved end 48, along the lowermost portion of the primary passage 42, to the horizontally aligned sampling weir 46. In this regard, the sampling weir 46 may be tangentially formed with the first curved end 48 of the downstream passage 38 as seen in FIG. 6. Further as seen in FIG. 6, the lowermost portion of the downstream passage 38 may horizontally extend from to the first curved end 48 to the outlet port 32.

With the valve housing 10 in this sterile access orientation and the main flow diaphragm 58 actuated in a closed position, the main flow diaphragm 58 sealably engages the downstream passage 38. Continued fluid flow into downstream passage 38 is inhibited. Because the sampling weir 46 and the lowermost portions of the downstream and primary passages 38, 42 are horizontally aligned, fluid drainage is encouraged from the downstream passage 38 and out of the valve housing 10 either over the sampling weir 46 or through the outlet port 32. In addition, with the sampling diaphragm 64 also in the closed position, fluid drainage is encouraged from the downstream passage 38 and out of the valve housing through the outlet port 32.

Referring now to the side view of the valve housing 10 as shown in FIG. 13, the primary passage 42 opens to the sampling valve mounting surface 16 formed upon the back face 20. As seen from this view, the primary passage 42 has a capital D-shaped cross section. In this regard, the primary passage 42 has opposing first and second curved ends 52, 54 extending from the sampling weir 46 adjacent the sampling valve mounting surface 16. The first curved end 52 of the primary passage 42 is disposed along the lowermost portion of the downstream passage 38 when the valve housing 10 is in the GMP orientation.

As mentioned above, the valve housing 10 is positionable in a GMP orientation as shown in FIGS. 12 and 13. In this GMP orientation, the main flow weir 40 and lowermost portions of the downstream and primary passages 38, 42 are horizontally aligned. As such, with the valve housing 10 in the GMP orientation, the lowermost portion of the downstream passage 38 horizontally extends from to the main flow weir 40, along the lowermost portion of the primary passage 42, to the first curved end 52 of the primary passage 42. In this regard, the main flow weir 40 may be tangentially formed with the first curved end 52 of the primary passage 42.

With the valve housing 10 in this GMP orientation and the main flow diaphragm 58 actuated in a closed position, the main flow diaphragm 58 sealably engages the downstream passage 38. Continued fluid flow into downstream passage 38 is inhibited. Because the main flow weir 40 and the lowermost portions of the downstream and primary passages 38, 42 are horizontally aligned, fluid drainage is encouraged from the downstream passage 38 and out of the valve housing 10 over the first curved end 52 of the primary passage 42.

In the embodiment of the present invention as shown in FIGS. 1–13, the downstream passage 38 adjacent the main flow valve mounting surface 14 is generally the same size as the primary passage 42 adjacent the sampling valve mounting surface 16.

Figure 14:
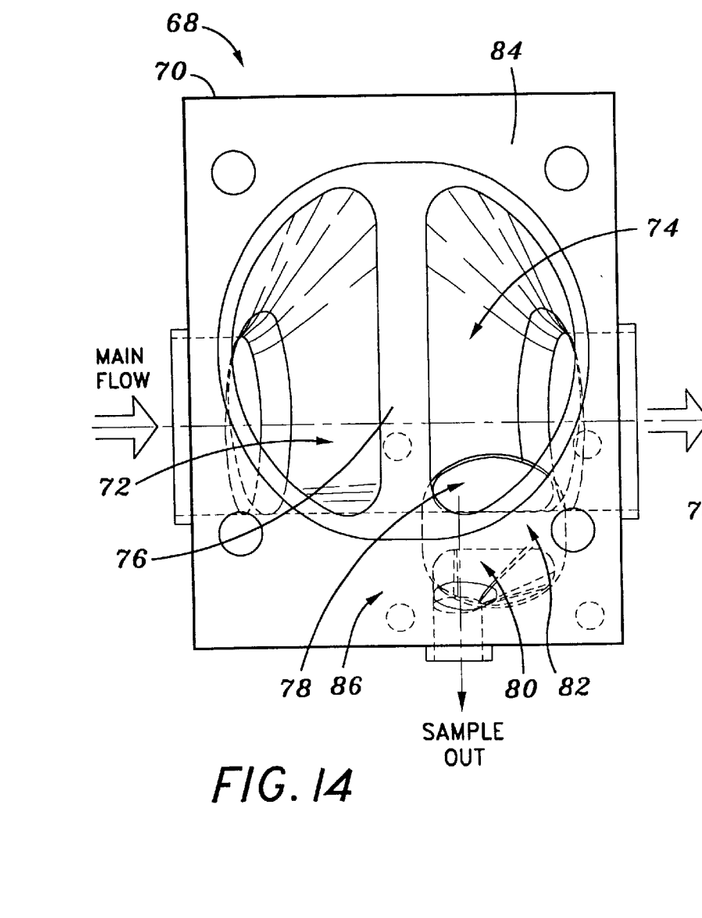
FIG. 14 is a side view of the integral sterile access/GMP valve housing, oriented in a sterile access orientation the main flow valve mounting surface shown (with internal passages shown in phantom) according to another embodiment of the present invention.
Figure 15:
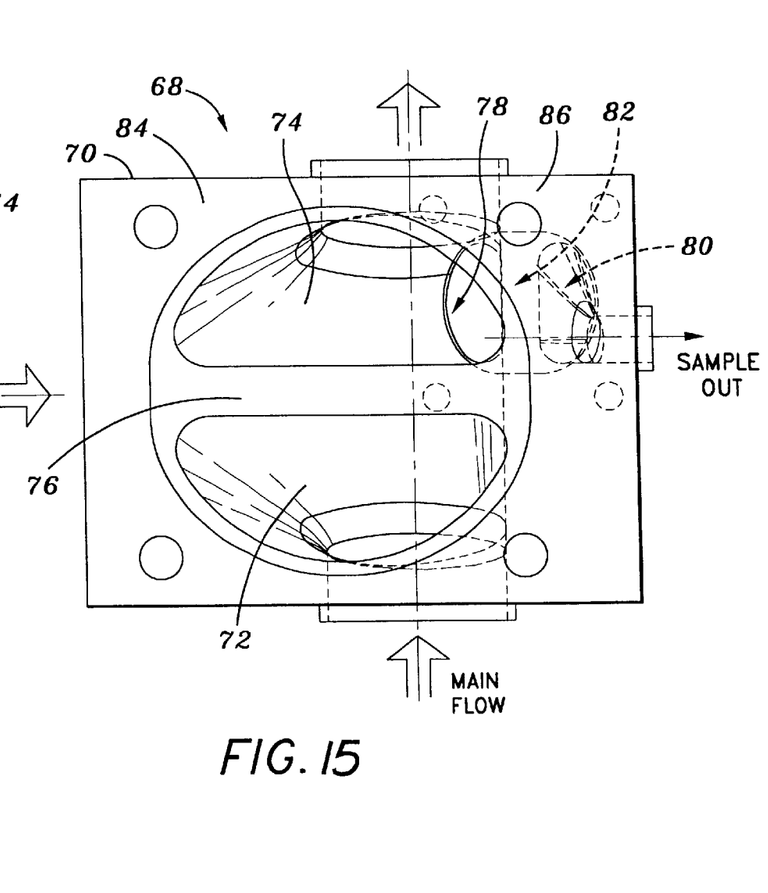
FIG. 15 is the integral sterile access/GMP valve housing of FIG. 14, oriented in a GMP orientation.

Referring now to FIG. 14, according to another embodiment of the present invention, there is depicted a side view of the integral sterile access/GMP valve housing 68. The valve housing 68 is oriented in a sterile access orientation. FIG. 15 is the valve housing 68 of FIG. 14, oriented in a GMP orientation. The valve housing 68 is generally formed according to the valve housing 10 as described above. In this regard, the valve housing 68 is provided with a main flow valve mounting surface 84 and an opposing sampling valve mounting surface 86. The valve housing 68 is provided with a valve housing block 70. The valve housing 10 is provided with an upstream passage 72 and a downstream passage 74 formed in the valve housing block 70. A main flow weir 76 is further formed in the valve housing block 70 between the upstream and downstream passages 72, 74 for controlling fluid flow between the upstream passages 72 to the downstream passage 74. The valve housing 68 is further provided with a primary passage 78 and a secondary passage 80. The primary passages 78 extends from the downstream passage 74. A sampling weir 82 is formed in the valve housing 68 and separates the primary and secondary passages 78, 80 for controlling fluid flow from the primary passage 78 to the secondary passage 80. Unlike the embodiment of the present invention as described above and shown in FIGS. 1–13, the downstream passage 74 adjacent the main flow valve mounting surface 84 is sized smaller than the primary passage 78 adjacent the sampling valve mounting surface 86. Advantageously, it is contemplated that such smaller sizing of the primary passage 78 mitigates the volume of fluid present in the primary passages 78 which may require drainage.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An integral sterile access/GMP valve housing comprising:

an integrally formed valve housing block;

main flow and sampling valve mounting surfaces formed upon the valve housing block;

an inlet port, an outlet port, and a sampling port each respectively formed in the valve housing block;

an upstream passage extending from the inlet port to the main flow valve mounting surface;

a downstream passage extending from the main flow valve mounting surface to the outlet port;

a main flow weir disposed adjacent the main flow valve mounting surface between the upstream and downstream passages for controlling flow between the upstream and downstream passages;

a primary passage extending from the downstream passage to the sampling valve mounting surface;

a secondary passage extending from the sampling valve mounting surface and to the sampling port; and a sampling weir disposed adjacent the sampling valve mounting surface between the primary and secondary passages for controlling flow between the primary and secondary passages;

wherein the valve housing is positionable in a sterile access orientation with the sampling weir and lowermost portions of the downstream and primary passages being horizontally aligned; and wherein the valve housing is positionable in a GMP orientation with the main flow weir and lowermost portions of the downstream and primary passages being horizontally aligned.

2. The valve housing of claim 1 wherein the main flow weir is formed perpendicular to the sampling weir.

3. The valve housing of claim 1 wherein the downstream passage has opposing first and second curved ends extending from the main flow weir adjacent the main flow valve mounting surface.

4. The valve housing of claim 3 wherein the first curved end of the downstream passage is disposed along the lowermost portion of the downstream passage when the valve housing is in the GMP orientation.

5. The valve housing of claim 3 wherein the sampling weir is tangentially formed with the first curved end of the downstream passage.

6. The valve housing of claim 1 wherein the primary passage has opposing first and second curved ends extending from the sampling weir adjacent the sampling valve mounting surface.

7. The valve housing of claim 6 wherein the first curved end of the primary passage is disposed along the lowermost portion of the primary passage when the valve housing is in the sterile access orientation.

8. The valve housing of claim 6 wherein the main flow weir is tangentially aligned with the first curved end of the primary passage.

9. The valve housing of claim 1 wherein the valve housing block is a rectangular body.

10. The valve housing of claim 1 wherein the valve housing block has a front face and an opposing back face, the main flow valve mounting surface is formed upon the front face, the sampling valve mounting surface is formed upon the back face.

11. The valve housing of claim 10 wherein the front and back faces are parallel.

12. The valve housing of claim 10 wherein the valve housing block has opposing first and second end faces, the inlet port is formed in the first end face, the outlet port is formed in the second end face.

13. The valve housing of claim 12 wherein the first and second end faces are formed orthogonal to the front and back faces.

14. The valve housing of claim 12 wherein the valve housing block has opposing third and forth end faces, the sampling port is formed in the third end face.

15. The valve housing of claim 1 wherein the downstream passage adjacent the main flow valve mounting surface is generally the same size as the primary passage adjacent the sampling valve mounting surface.

16. The valve housing of claim 1 wherein the downstream passage adjacent the main flow valve mounting surface is sized smaller than the primary passage adjacent the sampling valve mounting surface.

* * * * *